C. A. DISBROW.
RAIL JOINT.
APPLICATION FILED OCT. 22, 1919.
1,332,207.
Patented Mar. 2, 1920.
2 SHEETS—SHEET 1.
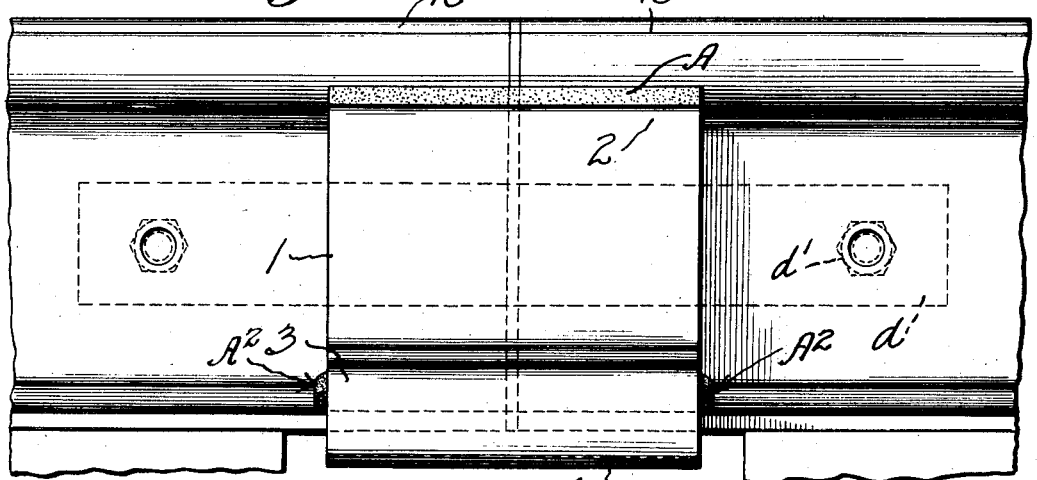
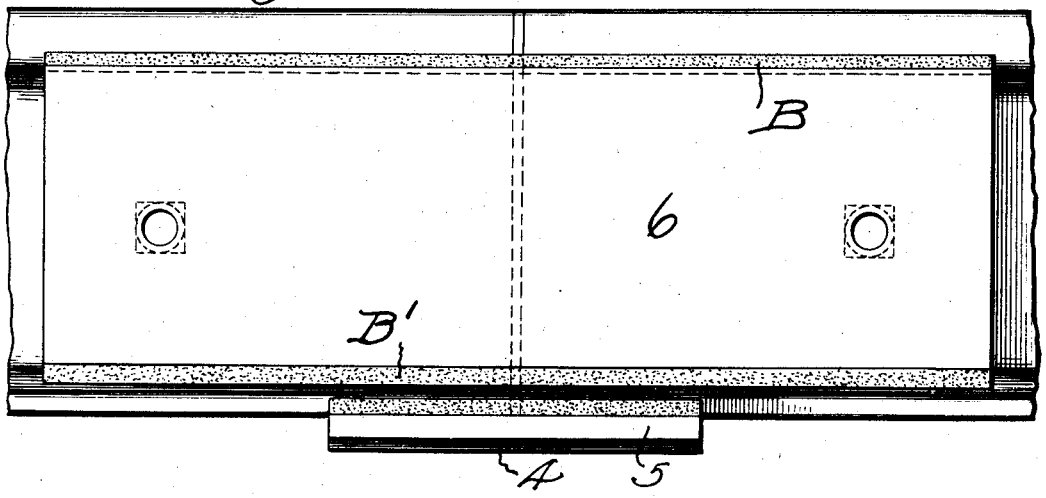
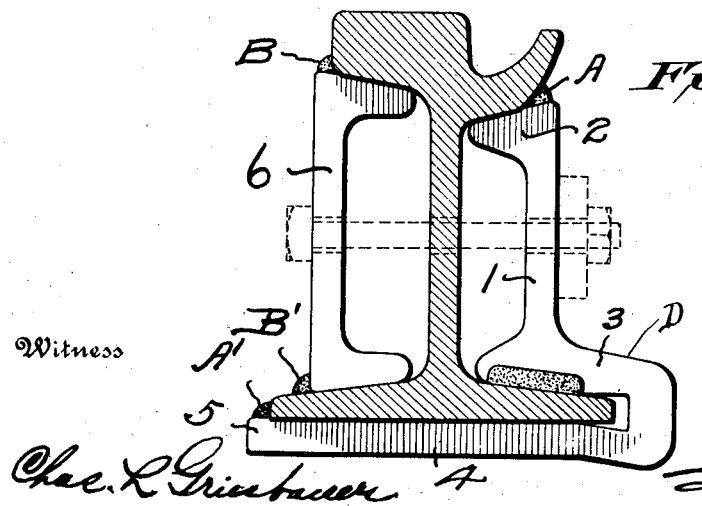

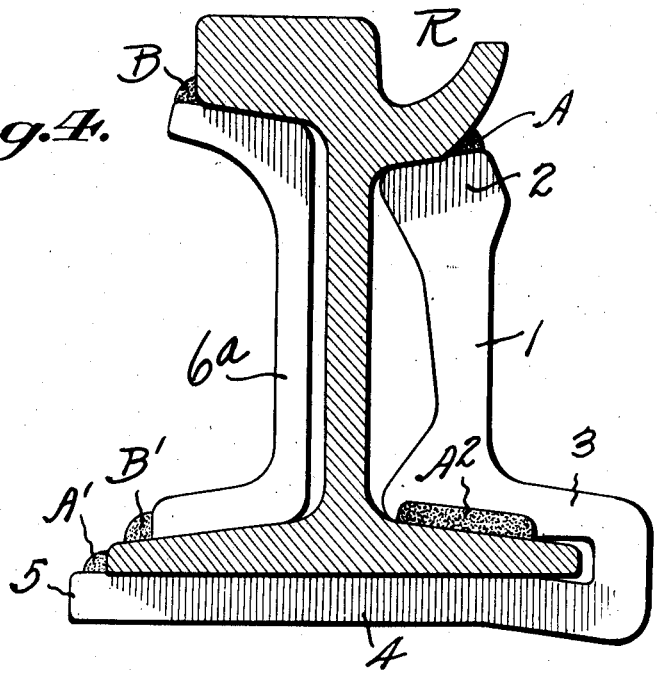
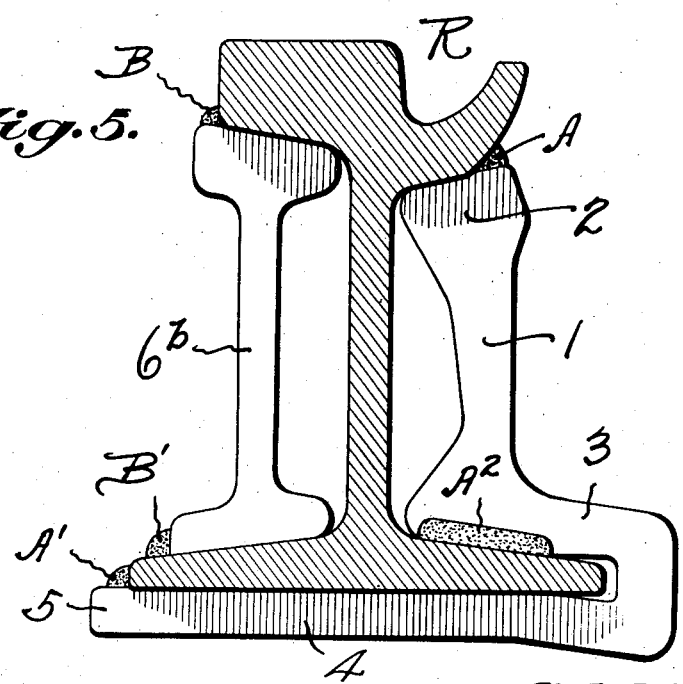

UNITED STATES PATENT OFFICE.

CLARKSON A. DISBROW, OF NEW ROCHELLE, NEW YORK, ASSIGNOR TO THE RAIL JOINT COMPANY, OF NEW YORK, N. Y., A CORPORATION OF NEW YORK.

RAIL-JOINT.

1,332,207.

Specification of Letters Patent.   Patented Mar. 2, 1920.

Application filed October 22, 1919. Serial No. 332,359.

*To all whom it may concern:*

Be it known that I, CLARKSON A. DISBROW, citizen of the United States, residing at New Rochelle, in the county of Westchester and State of New York, have invented certain new and useful Improvements in Rail-Joints, of which the following is a specification.

This invention relates to an improvement in rail joints possessing special utility as a welded joint, and embodying novel features of construction to better adapt the joint to load strains and wave motion in the rails.

A primary object of the invention is to provide a rail joint structure adapted particularly for a welded rail joint and intended to overcome practical disadvantages in the ordinary forms of welded joints, particularly those joints in which the fish plates or joint bars upon opposite sides of the rails are of equal length and extend throughout the joint. Furthermore, in the ordinary types of welded rail joints generally employed there is either insufficient base support for the rails or the joint is entirely too stiff to properly take care of the wave motion and the load strains. Therefore, it is proposed by the present invention to provide a construction wherein a very rigid and substantial rail support and splice is located at the center of the joint about the meeting ends of the rails, while toward the ends of the joint the latter is of lighter construction so as to improve the flexibility of the joint and better adapt it to the passing of the rail wave motion through the joint. At the same time the invention has in view a combination of parts which so locate the welding areas as to greatly lessen the danger of the rail or joint parts being injured by the welding operation.

Accordingly, a general object of the invention is to provide a very light and economical welded rail joint having the desirable features of a continuous rail joint and also providing a more flexible welded joint better adapted to absorb and distribute the load strains and to more readily carry the rail wave motion through the joint without breaking or rupturing the connected parts.

A more specific object involved in the foregoing general object is to utilize joint bars of standard or accepted types in such a way as to use the least amount of metal and still have a strong joint.

With the above and other objects in view which will more readily appear as the nature of the invention is understood the same consists in the novel construction, combination and arrangement of parts hereinafter more fully described, illustrated and claimed.

A preferred and practical embodiment of the invention is shown in the accompanying drawings, in which:—

Figure 1 is a side elevation of a rail joint constructed in accordance with the present invention, the dotted lines therein indicating a temporary clamping unit for holding the joint parts in position prior to the welding operation.

Fig. 2 is an elevation of the opposite side of the joint shown in Fig. 1.

Fig. 3 is a vertical sectional view taken at the end of the joint.

Fig. 4 is a vertical sectional view of the present improved joint including a splice bar of the inverted channel type.

Fig. 5 is a vertical sectional view showing an I-beam type of splice bar used in connection with the continuous joint bar which constitutes the other half of the joint.

Similar references designate corresponding parts throughout the several figures of the drawings.

The present invention, as a fundamental feature thereof contemplates the use of joint bars of different lengths on opposite sides of the rail which has the advantage of providing a gradual change in section from that of the rail to that of the joint at its center whereby less resistance is offered to the wave motion in the rails, due to approaching wheel loads, than a joint in which both bars are of the same length. In this connection it may be noted that it is proposed to employ a relatively short joint bar at the center of the joint which is of the continuous type while the bar at the opposite side may be a splice bar of suitable cross-section and of a length corresponding substantially to the standard joint bar which extends into the region of the bolt holes in the rail webs. This combination of bars when welded to the rails provides a very light and economical rail joint while at the same time performing the functions of the continuous bar and providing a more flexible welded joint better adapted to absorb and distribute the load strains.

In carrying forward this improvement the invention is particularly susceptible of application to girder rails of the high-T type ordinarily used by street railways. However, it will of course be understood that the invention is by no means limited to this use since its features and advantages may be found equally useful in connection with standard rails.

As shown in Fig. 1 of the drawings it is proposed to employ a joint bar 1 of the continuous type which includes a head portion 2 for engaging beneath the head of the rail R, foot flange portion 3 for engaging the upper side of the rail flange, and a supporting base flange portion 4 extending entirely across the base of the rail and projecting beyond one edge thereof as indicated at 5 to provide for securely welding the edge of the base flange in position. As shown, this continuous joint bar is of relatively short length and only embraces the rails in the immediate vicinity of their ends, but at this point provides a rigid base support for a relatively short distance at either side of the junction which materially strengthens the joint.

The opposite side of the joint is formed by a spice bar 6 which may be of the channel formation shown in Figs. 1 to 3 inclusive wherein the web of the channel assumes an out-standing position with reference to the rail web and completely fills the fishing space of the rail for the full length of the joint. Thus, by comparison the splice bar 6 is considerably longer than the continuous joint bar 1 to provide greater flexibility in the joint and eliminate the possibility of a sharp kink in the rail alinement. This is an advantage which becomes more apparent when the joint is applied to rails in curved sections of track.

The initial application of the joint parts 1 and 6 to the rail may be facilitated by the use of a temporary clamping device D shown in dotted lines in Figs. 1 and 3 and consisting of a suitable clamping plate $d$ and the bolts $d'$. This device is intended to hold the bars in position until they are welded respectively at the points A and A' and B and B', and also provides means for fastening the joint when the rail is being laid and the track thrown into line. The welds A and A' and B and B' are preferably of the type known as the seam weld and serve to rigidly unite the edge portion of the joint bars to the rail to thus provide a strong joint without the use of bolts, and the continuous bar 1 is also preferably welded as at $A^2$ to the top surface of the rail base to securely hold the same in position at the center of the joint. The welding operation may be performed by the oxyacetylene welding process.

By reason of the differential length of the joint bars 1 and 6 numerous advantages are obtained, and conspicuous among these advantages is that of providing a light but strong joint since the bar which is of the continuous type covers only a relatively short part of the entire joint length while the standard full length splice bar holds the rails to good alinement and coöperates with the relatively short continuous bar to provide a joint construction wherein the load strains are progressively absorbed by reason of the relative increase in the section of metal toward the center of the joint whereby the passing wheel loads are more effectively distributed. Furthermore, by reason of the relatively small and scattered character of the welds necessary to hold the joint bars in place, the metal in the bars and rail is relieved of concentrated welding heat which frequently has damaging results.

By way of illustrating the range of application of the invention reference may be made to Figs. 4 and 5 of the drawings which respectively show an inverted channel type of splice bar $6^a$ whose web is located relatively close to the rail web, and an I-beam type of splice bar $6^b$. In each instance it is proposed to weld the splice bars $6^a$ and $6^b$ respectively to the rail head and upper side of the rail base throughout their length.

From the foregoing it is thought that the features and advantages of the present invention will be readily apparent without further description, and it will of course be understood that further changes in the type and design of parts may be resorted to without departing from the spirit of the invention or scope of the appended claims.

I claim:—

1. A rail joint including in combination with the rails, a relatively short joint bar confined to the central portion of the joint and provided with an upright member fitting the fishing spaces of the rails at one side and having a rail supporting base member extending beneath the bases of the rails, a relatively long joint bar fitting the fishing spaces at the opposite sides of the rails, and fastening means for securing the joint bars to the rails.

2. A rail joint including in combination with the rails, a joint shoe embracing the adjacent rail ends, a joint bar arranged at the side of the rails opposite the upright member of the shoe and of a greater length than the latter, and permanent fastening means for the said shoe and bar.

3. In a rail joint, the combination with the rails, a joint shoe having a welded connection with the heads and base flanges of the rails, and a joint bar arranged at the side of the rails opposite the upright members of the shoe and having welded connections with the heads and base flanges of the rails.

4. A welded rail joint, including in combination with the rails, a relatively short joint shoe whose upright member is welded to the heads and base flanges of the rails at one side and whose base member is welded to one of the flanges of the rails, and a relatively long joint bar arranged opposite the upright member of the shoe and having welded connections with the heads and flanges of the rails.

5. In a welded rail joint, the combination with the rails, of joint bars of different length welded to opposite sides of the rails.

6. In a welded rail joint, the combination with the rails, of joint bars of different length welded to opposite sides of the rails, and one of said joint bars being of the continuous base supporting type.

7. In a welded rail joint, the combination with the rails, of joint bars of different length welded to opposite sides of the rails, one of said bars being of the continuous base supporting type and the other being a splice bar.

8. In a welded rail joint, the combination with the rails, of a joint bar of the continuous type embracing the rail ends and welded thereto, and a splice bar of greater length than the continuous bar welded to the opposite sides of the rails.

9. In a welded rail joint, the combination with the rails, of a splice bar adapted to fit in the fishing spaces of the rails at one side and welded to the rails, and a joint bar of the continuous type being of shorter length than the splice bar and welded to the opposite sides of the rails.

10. In a welded rail joint, the combination with the rails, of joint bars of different length welded to opposite sides of the rail and providing load supporting sections progressively increasing in area toward the center of the joint.

11. In a welded rail joint, the combination with the rail ends, of a joint bar of the continuous type welded to the rails in the vicinity of their ends, and a splice bar fitted in the fishing space at the opposite side of the rail and welded thereto, said splice bar being of greater length than the continuous bar and constituting a wave and load distributing member for the joint.

In testimony whereof I hereunto affix my signature in the presence of two witnesses.

CLARKSON A. DISBROW.

Witnesses:
E. K. KERSHNER,
KATHERINE McNALLY.